(12) United States Patent
Rishton et al.

(10) Patent No.: US 9,011,080 B2
(45) Date of Patent: Apr. 21, 2015

(54) TURBINE ENGINE SUPPORT ARMS

(75) Inventors: Julian Rishton, Burnley (GB); Ian Taylor, Burnley (GB)

(73) Assignee: Aircelle Limited, Burnley (GB)

( * ) Notice: Subject to any disclaimer, the term of this patent is extended or adjusted under 35 U.S.C. 154(b) by 893 days.

(21) Appl. No.: 13/255,410

(22) PCT Filed: Mar. 2, 2010

(86) PCT No.: PCT/GB2010/050366
§ 371 (c)(1),
(2), (4) Date: Mar. 30, 2012

(87) PCT Pub. No.: WO2010/103303
PCT Pub. Date: Sep. 16, 2010

(65) Prior Publication Data
US 2012/0243984 A1    Sep. 27, 2012

(30) Foreign Application Priority Data
Mar. 9, 2009  (GB) .................................. 09040015

(51) Int. Cl.
*F01D 25/16*   (2006.01)
*F02C 7/20*    (2006.01)

(52) U.S. Cl.
CPC ............... *F01D 25/162* (2013.01); *F02C 7/20* (2013.01); *Y02T 50/672* (2013.01); *F05D 2300/603* (2013.01); *F05D 2300/133* (2013.01)

(58) Field of Classification Search
CPC ....................................................... F01D 25/28
USPC ........................................ 415/142, 213.1, 182
See application file for complete search history.

(56) References Cited

U.S. PATENT DOCUMENTS

| | | | |
|---|---|---|---|
| 2,692,724 A | | 10/1954 | McLeod |
| 2,961,150 A | * | 11/1960 | Pirtle ............................ 417/352 |
| 3,369,366 A | | 2/1968 | Howald |
| 3,398,535 A | | 8/1968 | Campbell et al. |
| 3,536,262 A | * | 10/1970 | Hachard .................. 239/265.19 |

(Continued)

FOREIGN PATENT DOCUMENTS

| DE | 19852603 A1 | 5/2000 |
|---|---|---|
| EP | 0298898 A2 | 1/1989 |

(Continued)

OTHER PUBLICATIONS

International Search Report for PCT/GB2010/050366 dated Apr. 19, 2011.

*Primary Examiner* — Dwayne J White
*Assistant Examiner* — Jason Fountain
(74) *Attorney, Agent, or Firm* — Shumaker, Loop & Kendrick, LLP

(57) ABSTRACT

A turbine engine support including a pair of arms for use in an arrangement of an engine having an inner case, an outer case and an interim fairing, the engine support arms comprising integrally formed arms arranged to extend from the outer case to the inner case and to be connected to the cases by a first and second end region respectively, and with an intermediate region of the pair of arms arranged to extend through the fairing, the pair of arms having a common first region located in the region of the outer case with the arms diverging from each other towards the inner case, and a fastening arrangement connecting the outer case to the arms, the fastener arrangement accessible from a direction extending between the two arms towards the first end region.

16 Claims, 3 Drawing Sheets

(56) References Cited

U.S. PATENT DOCUMENTS

| | | | |
|---|---|---|---|
| 3,540,682 A * | 11/1970 | Howard et al. | 244/53 R |
| 4,132,069 A * | 1/1979 | Adamson et al. | 60/226.1 |
| 4,197,702 A * | 4/1980 | Robertson | 60/262 |
| 4,820,117 A * | 4/1989 | Larrabee et al. | 415/142 |
| 4,979,872 A | 12/1990 | Myers et al. | |
| 5,484,120 A * | 1/1996 | Blakeley et al. | 244/54 |

FOREIGN PATENT DOCUMENTS

| | | |
|---|---|---|
| GB | 712783 A | 7/1954 |
| GB | 728670 | 4/1955 |
| GB | 1557096 A | 12/1979 |
| GB | 2188987 A | 10/1987 |
| WO | 2005012696 A1 | 2/2005 |

\* cited by examiner

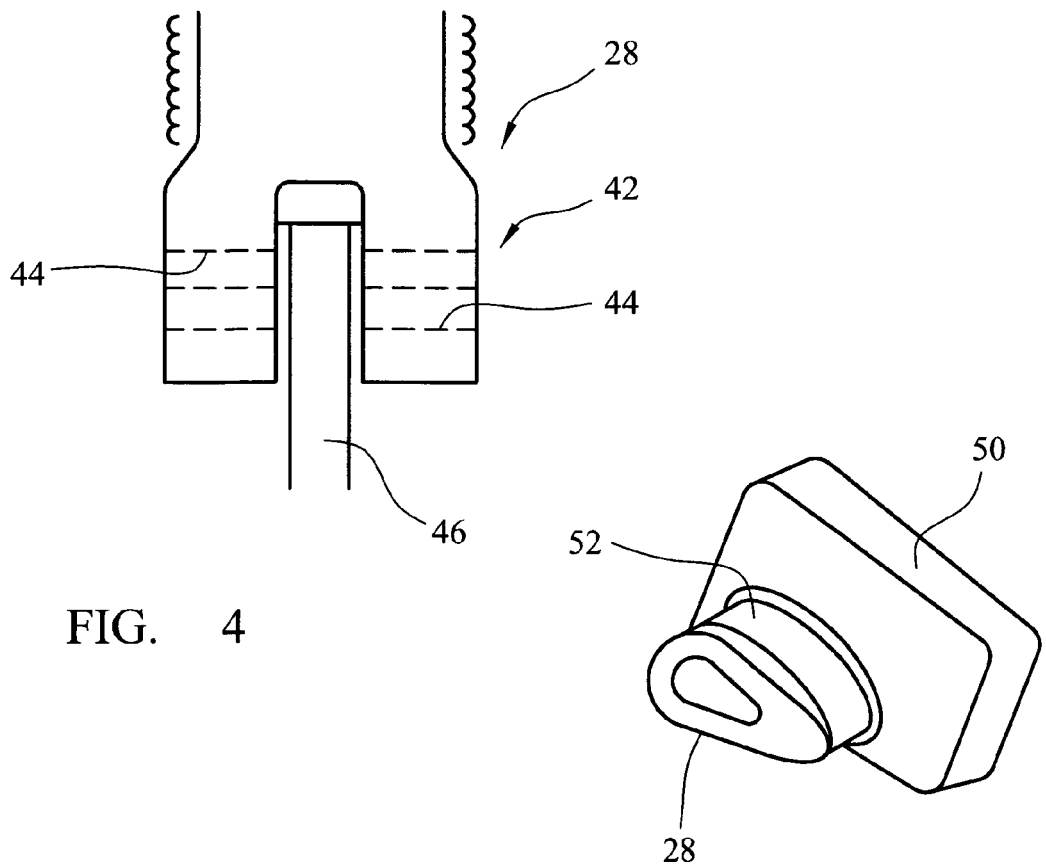
FIG. 4
FIG. 5
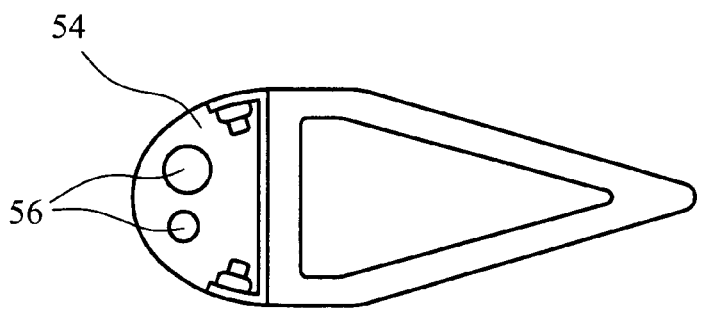
FIG. 6
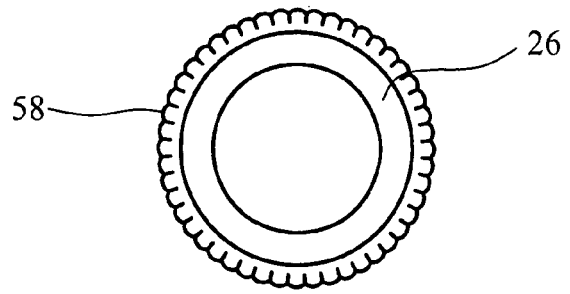
FIG. 7

TURBINE ENGINE SUPPORT ARMS

CROSS-REFERENCE TO RELATED APPLICATIONS

This application claims priority to PCT/GB2010/050366 filed Mar. 2, 2010, which claims priority to GB0904001.5 filed Mar. 9, 2009, the contents of each of which are incorporated by reference herein.

BACKGROUND

The present invention relates to turbine engine support arm, a turbine engine support assembly and a method of forming a turbine engine support arm.

In jet engines it is essential that the integrity and stability of the turbine be maintained. FIG. 1 is a schematic view of an outer rear fan case 10, an intermediate core fairing 12 and a turbine inner case or intercase 14.

The outer case 10 and the core fairing 12 are often connected by upper and lower splitters 16 and 18. The splitters are elongate in the direction of intended air flow and have aerodynamically shaped ends to reduce the drag of the splitters. Vents 20 are provided in the core fairing 12.

Should a turbine blade become loose then it is essential that the engine be held in place despite its out of balance state.

To assist in maintaining the engine in place the intercase 14 is indirectly connected to the outer case 10 by aligned inner supports 22 with aligned outer supports 24 connecting the core fairing 12 to the fan case 10. Each support 22 and 24 make up a single arm that is pivotally connected at one end to the inner case 14.

The supports 22 and 24 are shown schematically in FIG. 1. They each comprise a titanium assembly made up of a number of different parts. When the engine is being assembled, the supports are connected between the intercase 14 and core fairing 12 and the core fairing 12 and the fan case 10. To assist in assembling the supports, the fairing is divided into at least four parts in a circumferential direction which can be assembled after the supports 22 and 24 are in position to surround the supports in the region of the fairing.

Each support 22 and 24 is complicated to fabricate because of the number of different parts that have to be assembled. In addition each support 22 and 24 must be connected together to form the arm. Then the arms have to be individually connected to the outer case and the inner case. Furthermore, the parts take time and require precision machining. In addition because of the many parts that have to be assembled the greater the risk that assembly is defective in some way and the greater the maintenance costs and the greater the risk of parts becoming loose during use.

U.S. Pat. No. 3,540,682, GB 2 188 987, WO 2005/012696, GB 712783, GB 728670 and DE 19852603 relate to turbine engines.

BRIEF SUMMARY

It is an object of the present invention to overcome at least one of the above or other problems.

The present invention is defined in the claims and elsewhere in this specification.

The arm may be hollow along its complete extent from the first end region towards the intermediate region and may be hollow through the intermediate region and may be hollow from the intermediate region towards and up to the second end region.

The cross-section of the exterior or interior of the arm or both cross-sections may be different in the extent of the arm between the first end region and intermediate region or between the intermediate region and the second end region or both. One or both of those cross-sections may vary outwardly along at least part of the extent of the arm in the direction extending from one end region towards the other end region.

The present invention also includes a method of forming turbine engine support arms for use in an arrangement of an engine having an inner case, an outer case and an interim fairing spaced from the inner case and outer case, the arms comprising integrally formed arms having a common first end region arranged in use, to be connected to the outer case by the common first end region and arranged, in use, to be connected by spaced second end regions of the arms to the outer case and with an intermediate region of each arm being arranged to extend through the fairing.

BRIEF DESCRIPTION OF THE DRAWINGS

The present invention can be carried into practice in various ways but one embodiment will now be described by way of example with reference to FIG. 1 and the following drawings, in which:

FIG. 4 is a detail of the connection of the support to the intercase 14;

FIG. 5 is a detail of the connection of the support to the core fairing 12;

FIG. 6 is a section through the line 6-6 of FIG. 2, and

FIG. 7 is a section through the line 7-7 of FIG. 2.

DETAILED DESCRIPTION OF THE INVENTION

Figure 1:
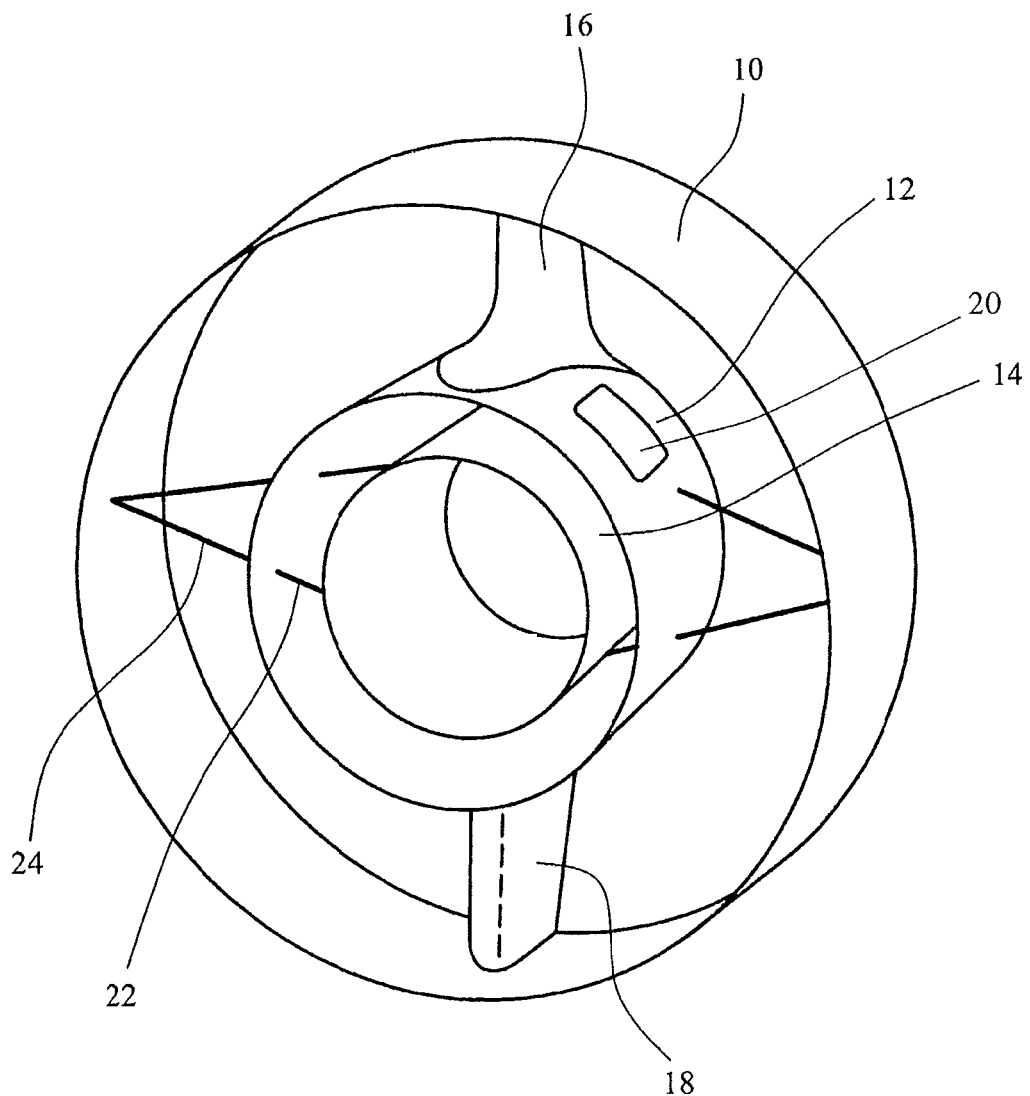
Figure 2:
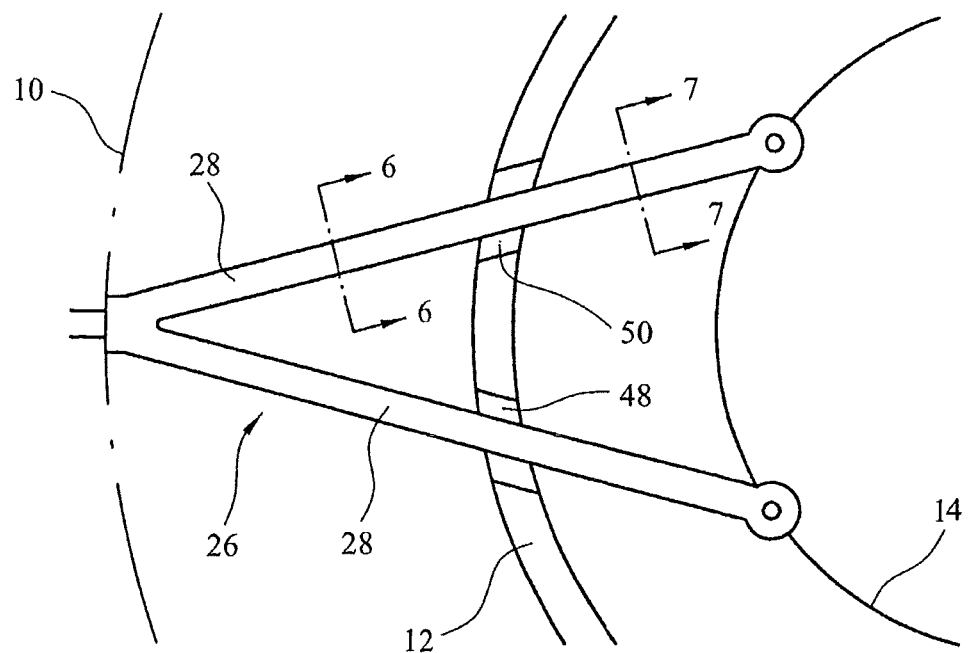
FIG. 2 is a schematic side view showing the connection of the intercase 14 and the fan case at one side (the connection at the other side is the same)

Referring to FIG. 2, the support 26 comprises integrally formed arms 28. Each arm is connected at a common region to the fan case 10. The arms diverge from each other, inwardly of the fan case where they pass through the core fairing 12 and are ultimately pivotally connected to the intercase 14.

The support 26 is formed by the resin transfer process. Dry carbon fibre is located in a mould. Then resin is injected into the mould under pressure. The combined resin and carbon fibre are then cured in an autoclave to thereby forming the support.

Figure 3:
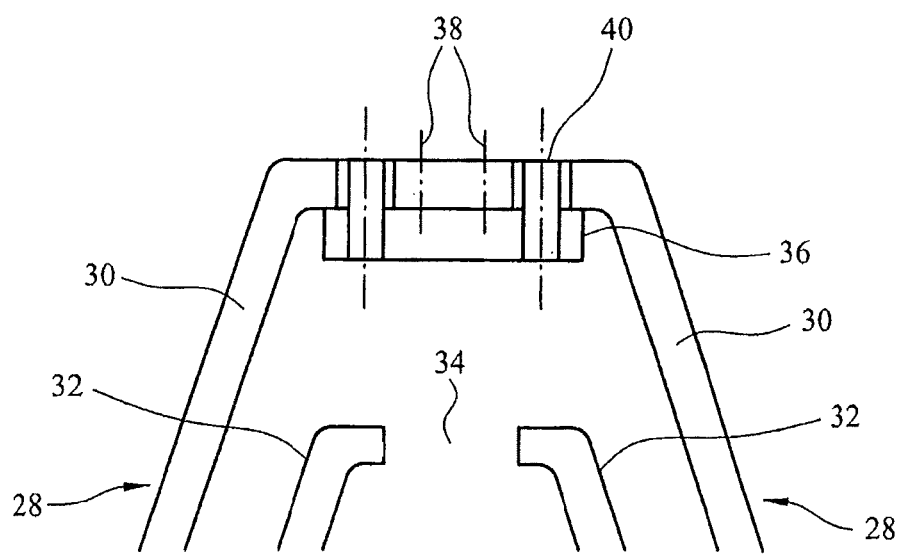
FIG. 3 is a detail of the connection of the support to the fan case.

FIG. 3 shows the form of the support 26 to the fan case. The outer extent of each arm 28 is hollow and each comprises an outer skin 30 and an inner skin 32. The outer and inner skins 30 and 32 are part of a continuous skin that extends around each support.

The outer extremity of the inner skins 32 of each arm terminate in an opening 34. A titanium plate 36 is inserted through the opening 34 and is connected to the common ends of the outer skins 30 by four fasteners 38 that extend through the outer skins 30.

The support 26 is connected to the fan case 10 by eight attachment bolts 40 passing through the fan case 10, the outer skins 30 and the plate 36 with nuts (not shown) clamping the skins 30 between the plate 36 and the fan case 10. Bushes may be provided in the moulding of the skins 30, if desired, in the openings that the bolts extend through.

FIG. 4 shows the attachment of one of the arms 28 to the intercase 14. The attachment of the other arm is the same. The arm terminates in a fork 42. Aligned openings 44 are formed in the fork and those openings are in turn aligned with an opening (not shown) in a flange 46 extending from, and fast with the intercase 14. A pivot member (not shown) is then passed through the aligned openings to effect a pivot connection of the arm 28 to the intercase 14.

FIGS. 2 and 5 show the passage of an arm 28 through the core fairing 12. The passage of the other arm is the same. The arm extends through an opening 48 in the fairing 12. A PPS moulding comprising an insert 50 fills that opening 48 with a sleeve 52 extending outwardly from the fairing surrounding the support in the vicinity of the fairing. The fairing comprises separate parts as previously described that are assembled to surround the supports.

FIG. 6 is a cross-section on the line 6-6 of FIG. 2. This shows a leading edge being defined by a titanium aerofoil 54. The aerofoil 54 is bolted onto the moulding. The aerofoil 54 includes openings 56 that can take engine system controls and monitors from the fan case 10, through the fairing 12 to the engine.

The titanium fairing is optional. If desired the moulding could have the same exterior shape as that shown in FIG. 6.

FIG. 7 is a section through the line 7-7 of FIG. 2. This shows the arm 26 being a circular tube. In the extent between the fairing 12 and the intercase 14 the arm 26 may be protected by a surrounding insulation layer 58.

The form of each arm, along the length of the arm may vary to optimise the strength and aerodynamic qualities of the arm. Accordingly the weight of the supports 26 can be kept to a minimum. Furthermore the arms can be hollow without the need for any machine or fasteners to form such a hollow. In addition, the exterior shape of the arms and/or the interior shape of the arms and/or the thickness of the material of each arm may be different at different elongate extents of the arm and any one or more of these factors may change continuously along at least one extent of the arm and may change continuously along the complete extent of the arm.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A turbine engine support for use in an arrangement of an engine having an inner case, an outer case and an interim fairing spaced from the inner case and the outer case, the turbine engine support comprising a pair of integrally formed arms arranged, in use, to extend from the outer case to the inner case and to be connected to those cases by a first and second end region respectively, and with an intermediate region of the pair of arms being arranged to extend through the fairing, the pair of arms having a common first region arranged, in use, to be located in a region of the outer case where the arms diverge from each other towards, in use, the inner case, and a fastening arrangement arranged to connect the outer case to the pair of arms, the fastening arrangement being accessible from a direction extending between the two arms towards the first end region, wherein at least one arm comprises a pair of spaced walls in the common first region with the fastening arrangement being accessible through an opening in an inner wall of the spaced walls.

2. A support as claimed in claim 1 in which each arm includes a pair of spaced walls in the common first region with the fastening arrangement being accessible through an opening common to the pair of integrally formed arms.

3. A support as claimed in claim 1 in which the second end region of each arm is arranged, in use, to be pivotally connected to the inner case.

4. A support as claimed in claim 3 in which the second end region of each arm includes a slot with aligned openings on each side through which, in use, a pivot member is arranged to extend.

5. A support as claimed in claim 1 in which the first end region is arranged, in use, to be fast with the outer case.

6. A support as claimed in claim 1 in which the arms are hollow along at least part of their extent.

7. A support as claimed in claim 1 in which a cross-section of the arms varies along their length.

8. A support as claimed in claim 1 in which the arms include insulation surrounding the arms along at least parts of their length.

9. A support as claimed in claim 1 in which the arms include engine systems extending along at least part of the extent of the arms.

10. A support as claimed in claim 1 in which engine systems are enclosed by the arms.

11. A support as claimed in claim 1 in which the arms comprise a composite material.

12. A support as claimed in claim 1 in which the arms include an edge portion fastened to the arms and extending along at least part of the edge of the arms.

13. A support as claimed in claim 12 in which the edge portion comprises titanium.

14. A turbine engine support assembly including an inner case, an outer case and an interim fairing spaced from the inner case and outer case, and a pair of integrally formed arms as claimed in claim 1 extending from the inner case to the outer case and through the fairing, the arms being connected to the inner and outer cases.

15. An assembly as claimed in claim 14 in which the fairing includes a sleeve at least partially surrounding the arms extending from the fairing towards at least one end region of the arms.

16. A method of forming a pair of arms included in a turbine engine as claimed in claim 1 comprising moulding the arm.

\* \* \* \* \*